(12) United States Patent
Ni

(10) Patent No.: US 7,563,296 B2
(45) Date of Patent: Jul. 21, 2009

(54) PERVASIVE DEDUSTING DEVICE FOR A VACUUM CLEANER

(75) Inventor: Zugen Ni, Suzhou (CN)

(73) Assignee: Suzhou Kingclean Floorcare Co., Ltd., Suzhou (CN)

( * ) Notice: Subject to any disclaimer, the term of this patent is extended or adjusted under 35 U.S.C. 154(b) by 524 days.

(21) Appl. No.: 11/397,861

(22) Filed: Apr. 5, 2006

(65) Prior Publication Data

US 2007/0144115 A1    Jun. 28, 2007

(30) Foreign Application Priority Data

Dec. 23, 2005    (CN) .................. 2005 1 0022683

(51) Int. Cl.
*B01D 50/00* (2006.01)
(52) U.S. Cl. .................. 55/337; 55/345; 55/DIG. 3; 15/353
(58) Field of Classification Search .................. 55/343, 55/459.1, 429, DIG. 3, 426, 428, 459.3, 59.5, 55/345, 322, 325, 326, 337; 15/353, 352; 210/512.2

See application file for complete search history.

(56) References Cited

U.S. PATENT DOCUMENTS

| | | | |
|---|---|---|---|
| 6,524,358 B2 * | 2/2003 | Yang | 55/337 |
| 7,175,682 B2 * | 2/2007 | Nakai et al. | 55/429 |
| 2003/0200736 A1 * | 10/2003 | Ni | 55/426 |

* cited by examiner

*Primary Examiner*—Duane Smith
*Assistant Examiner*—Dung Bui
(74) *Attorney, Agent, or Firm*—Oliff & Berridge, PLC

(57) ABSTRACT

It is provided in the present invention with a pervasive dedusting device for a vacuum cleaner, which includes a tank with a wind inlet and a wind outlet. A filter barrel is mounted inside the tank while a cyclone barrel is mounted inside the filter barrel. The cyclone barrel is configured to be a conical barrel with a smaller upper end and a larger lower end and a cyclone wind inlet is disposed on it. The wind inlet on the tank and the cyclone wind inlet on the cyclone barrel are separated by the filter barrel and located in two chambers respectively. A wind outlet tube is located in the upper end of the cyclone barrel and communicates with the wind outlet. The pervasive dedusting device has low air flow pressure loss, improved dust suction effect, fine dust filtering function, decreased operation noise, and it can effectively prevents secondary pollution and filter out fine dust completely.

10 Claims, 3 Drawing Sheets

PERVASIVE DEDUSTING DEVICE FOR A VACUUM CLEANER

FIELD OF INVENTION

The present invention relates to a pervasive dedusting device for a vacuum cleaner.

BACKGROUND OF THE INVENTION

All the vacuum cleaners on the current market are arranged with a filter device for filtering suctioned dust-laden air and leaving dust particles in a dust collecting device. The filter device should be cleaned or replaced after the vacuum cleaner has been used for a period of time, otherwise, fine dust may clog filter holes of the filter device, which will increase resistance of the vacuum motor, even burn the motor out, thereby not only bringing trouble to users, but also adversely affecting performance and life-span of the vacuum cleaner.

In recent years, a cyclone dedusting device is used to replace the filter device by manufacturers according to the principle of cyclone separation, which has a better dedusting effect and is widely used in vacuum cleaners. A conical barrel with a larger upper end and a smaller lower end is mounted in the tank of the cyclone dedusting device, and a wind outlet tube is disposed in a longitudinal direction at the upper end of the conical barrel, the lower end of the conical barrel is opened so as to allow dust to fall into the bottom of the tank, a wind inlet tube enters a sidewall of an upper portion of the conical barrel along a tangent direction, so that the dust-laden air flow forms cyclone in the conical barrel, and the dust particles fall into a bottom of a dust collecting barrel along the sidewall of the conical barrel by centrifugal force. The dedusted air flows upwards and is expelled out through the wind outlet tube.

However, the cyclone dedusting device described above has a relatively larger bulk, and an especially larger bulk is required while it is used in a large vacuum cleaner requiring a relative larger air flow, which not only increases manufacturing cost thereof, but also brings much inconvenience to users.

Besides, the cyclone barrel of the dedusting device described above is in a reversed conical shape with a larger upper end and a smaller lower end and separates dust by accelerated rotation of air flow. As a result, air flow pressure loss is relatively high, which adversely affects dust suction effect of the vacuum cleaner.

Furthermore, the accelerated air flow may easily raise again the fine dust which have fallen to the bottom of the dust tank, and the raised fine dust will be expelled out from the wind outlet tube with the air flow, thereby resulting in secondary pollution. So the device is more suitable for separating coarse particles and is less effective in separating fine particles.

BRIEF SUMMARY OF THE INVENTION

The object of the present invention is to provide a pervasive dedusting device for a vacuum cleaner, which has low air flow pressure loss, improved dust suction effect, fine dust filtering function, decreased operation noise, and it can effectively prevents secondary pollution and filter out fine dust completely.

In one technical solution of the present invention, it is provided with a pervasive dedusting device for a vacuum cleaner, which includes a tank with a wind inlet and a wind outlet. The tank is provided with a first cyclone device and a second cyclone device therein. The first cyclone device thereof includes a filter barrel while the second cyclone device includes a cyclone barrel disposed inside the filter barrel. The cyclone barrel is configured to be a conical barrel with a smaller upper end and a larger lower end as well as a cyclone wind inlet disposed on it. The wind inlet on the tank and the cyclone wind inlet on the cyclone barrel are separated by the filter barrel and located in two chambers respectively. A wind outlet tube is located in the upper end of the cyclone barrel and communicates with the wind outlet.

In a detailed technical solution of the present invention, it is provided with a pervasive dedusting device for a vacuum cleaner, which includes a tank with a wind inlet and a wind outlet. A filter barrel is mounted inside the tank while a cyclone barrel is mounted inside the filter barrel. The cyclone barrel is configured to be a conical barrel with a smaller upper end and a larger lower end as well as a cyclone wind inlet disposed on it. The wind inlet on the tank and the cyclone wind inlet on the cyclone barrel are separated by the filter barrel and located in two chambers respectively. A wind outlet tube is located in the upper end of the cyclone barrel and communicates with the wind outlet. The cyclone barrel includes an upper cylinder barrel and a lower conical barrel. The wind outlet tube enters inside the upper end of the cylinder barrel and the cyclone wind inlet is located on the sidewall of the cylinder barrel. There is also a dust-collecting opening in the lower end of the conical barrel. The lower portion of the cyclone barrel is provided with an umbrella-shaped reflecting plate which defines a refluence hole in the center. A ring gap for dust-falling is defined between the peripheral of the umbrella-shaped reflecting plate and the sidewall of the cyclone barrel. Within the cyclone barrel, the lower portion of the ring gap for dust-falling is provided with a dust-collecting barrel, whose bottom end with an opening is connected to the bottom cover of the tank.

In a further detailed technical solution of the present invention, it is provided with a pervasive dedusting device for a vacuum cleaner, which includes a tank with a wind inlet and a wind outlet. A filter barrel is mounted inside the tank while a cyclone barrel is mounted inside the filter barrel. The cyclone barrel is configured to be a conical barrel with a smaller upper end and a larger lower end as well as a cyclone wind inlet disposed on it. The wind inlet on the tank and the cyclone wind inlet on the cyclone barrel are separated by the filter barrel and located in two chambers respectively. A wind outlet tube is located in the upper end of the cyclone barrel and communicates with the wind outlet. The cyclone barrel includes an upper cylinder barrel and a lower conical barrel. The wind outlet tube enters inside the upper end of the cylinder barrel and the cyclone wind inlet is located on the sidewall of the cylinder barrel. There is also a dust-collecting opening in the lower end of the conical barrel. The lower portion of the cyclone barrel is provided with an umbrella-shaped reflecting plate which defines a refluence hole in the center. A ring gap for dust-falling is defined between the peripheral of the umbrella-shaped reflecting plate and the sidewall of the cyclone barrel. Within the cyclone barrel, the lower portion of the ring gap for dust-falling is provided with a dust-collecting barrel, whose bottom end with an opening is connected to the bottom cover of the tank. The tank includes tank body and tank cover. The wind inlet is disposed in the upper portion of the tank body while the wind outlet is located in the top of the tank cover. The cyclone wind inlet of the cyclone barrel is positioned within the tank cover and an upper end of the filter barrel with an opening is connected beneath the peripheral of the tank cover. The lower inner wall of the filter barrel is connected tightly to the lower outer wall of the cyclone barrel.

The advantages of the present invention are as follows:
1. As the cyclone barrel according to the present invention is configured to be a conical barrel with a smaller upper end and a larger lower end and both of the cyclone wind inlet and the wind outlet tube are located in the upper portion of the cyclone barrel, air flow rotates in a decelerated and eccentric state in the cyclone barrel, thereby pressure loss of the air flow is reduced and an improved dust suction effect is thus obtained.
2. The rotation speed of the air flow in the lower portion of the cyclone barrel according to the present invention is slower than that in the upper portion thereof, which prevents dust in the dust-collecting barrel from being raised again. Therefore air expelled from the wind outlet tube won't generate secondary pollution.
3. As compared with the prior art whose tanks have larger bulks and less promising separation effect for fine dust particles, the device according to the present invention is able to separate fine dust particles and has an improved dedusting effect.
4. The device according to the present invention can not only remove fine dust particles but also decrease noise produced in operation.

BRIEF DESCRIPTION OF THE DRAWINGS

The present invention will be further described below in conjunction with the drawings and the embodiments.

DESCRIPTION OF THE PREFERRED EMBODIMENTS

Figure 1:
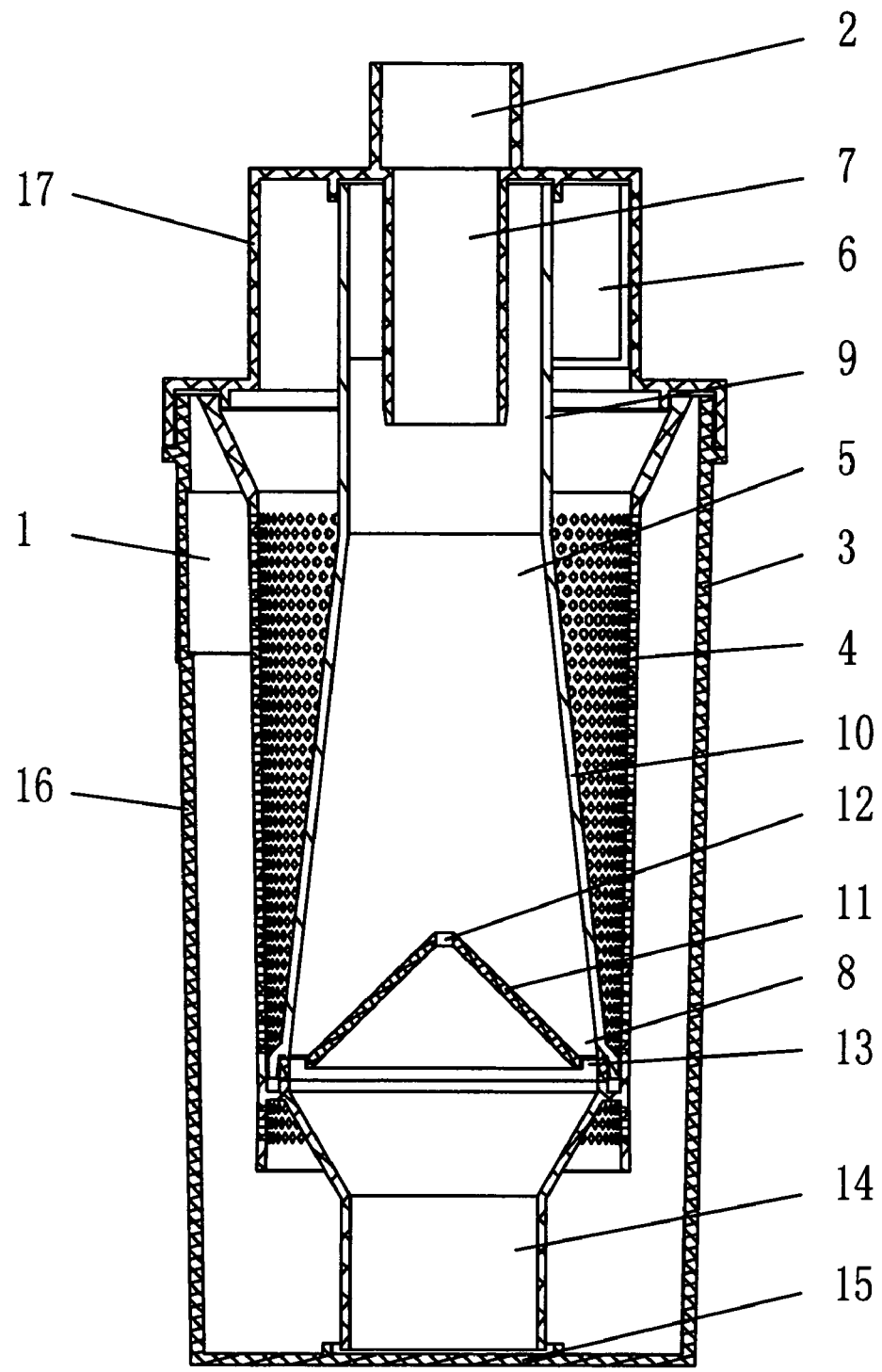
FIG. 1 is a front cross-sectional view of the present invention.
Figure 2:
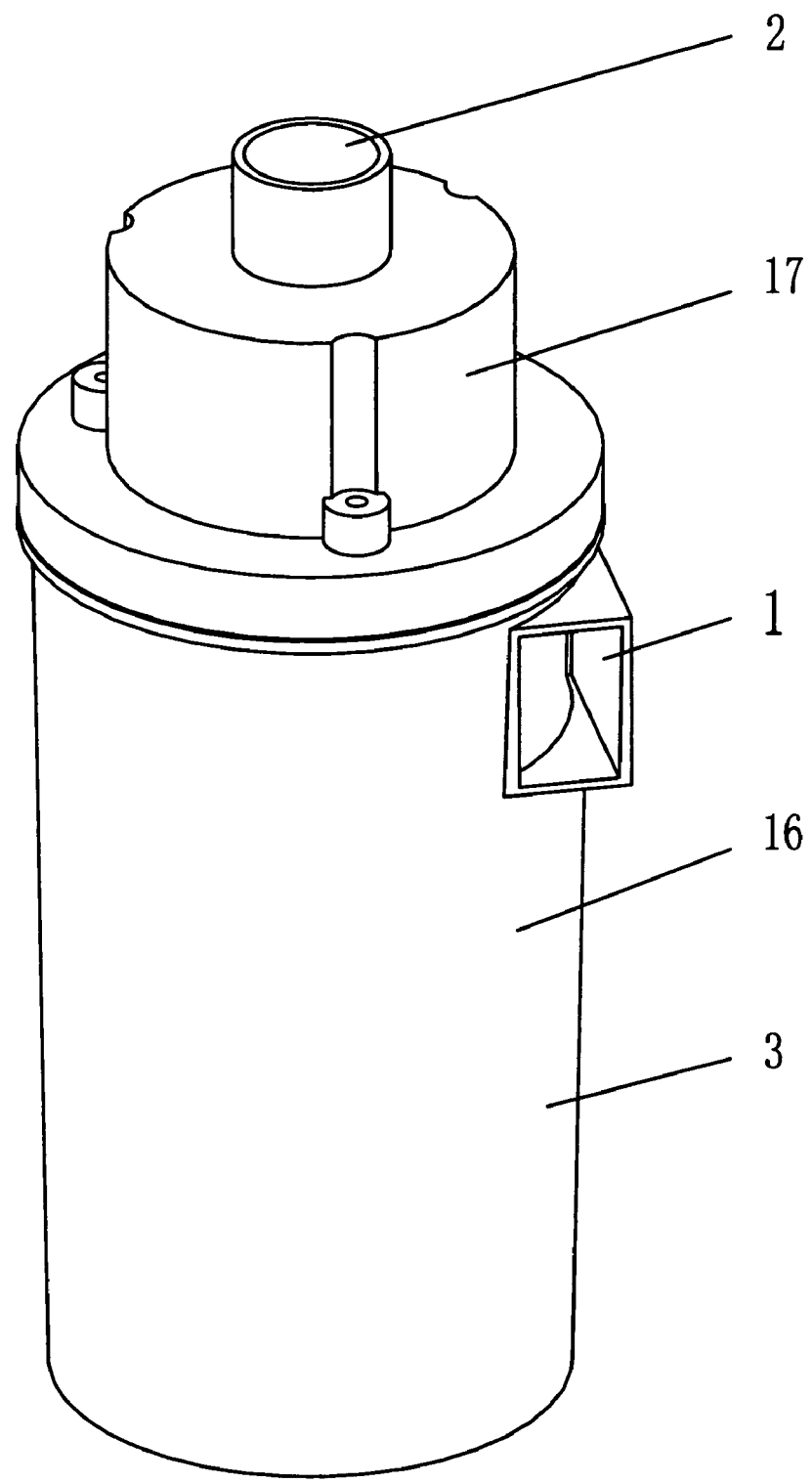
FIG. 2 is a solid view of the present invention.
Figure 3:
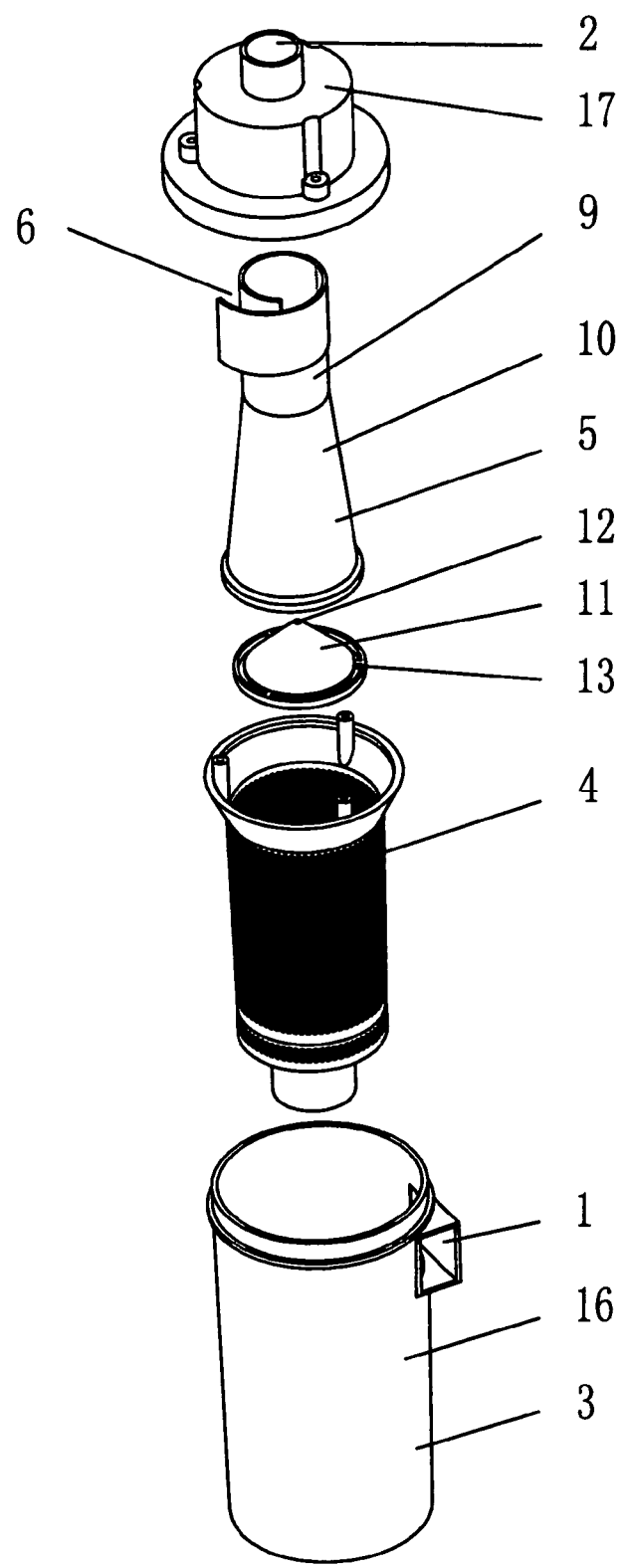
FIG. 3 is an exploded schematic view of the present invention showing the interior configuration thereof.
In the drawings: 1 wind inlet; 2 wind outlet; 3 tank; 4 filter barrel; 5 cyclone barrel; 6 cyclone wind inlet; 7 wind outlet tube; 8 dust-collecting opening; 9 cylinder barrel; 10 conical barrel; 11 umbrella-shaped reflecting plate; 12 refluence hole; 13 ring gap for dust-falling; 14 dust-collecting barrel; 15 bottom cover; 16 tank body; 17 tank cover.

Referring to FIGS. 1, 2, and 3, a pervasive dedusting device for a vacuum cleaner in one preferred embodiment according to the present invention, comprises a tank 3 which includes a tank body 16 and a tank cover 17. A wind inlet 1 is disposed in the upper sidewall of the tank body 16 while a wind outlet 2 is located in the top of the tank cover 17. A filter barrel 4, whose upper end with an opening connected beneath the peripheral of the tank cover 17, is mounted inside the tank 3. A cyclone barrel 5 is mounted inside the filter barrel 4. The cyclone barrel 5 includes an upper cylinder barrel 9 whose upper portion enters upwards the tank cover 17 and a lower conical barrel 10 configured to have a smaller upper end and a larger lower end. A wind outlet tube 7 is located in the cylinder barrel 9 and communicates with the wind outlet 2 in the tank cover 17. A cyclone wind inlet 6 is disposed on the sidewall of the cylinder barrel 9. There is also a dust-collecting opening 8 in the lower end of the conical barrel 10. The lower inner wall of the filter barrel 4 is connected tightly to the lower outer wall of the conical barrel 10. The lower portion of the conical barrel 10 near the dust-collecting opening 8 is provided with an umbrella-shaped reflecting plate 11 which defines a refluence hole 12 in the center. A ring gap for dust-falling 13 is defined between the peripheral of the umbrella-shaped reflecting plate 11 and the sidewall of the conical barrel 10. A dust-collecting barrel 14 is located bellow the lower portion of the ring gap for dust-falling 13, whose bottom end with an opening is connected to a bottom cover 15 of the tank 3.

During operation, the dust-laden air enters the tank 3 via wind inlet 1, and then the dust-laden air enters the cyclone barrel 5 via cyclone wind inlet 6 after coarse dust removed by the filter barrel 4. Once enter the cylinder barrel 9, the air flow rotates in a decelerated state downwards to the umbrella-shaped reflecting plate 11. In this time, the majority of the air flow dedusted by centrifugal force forms upward cyclone and is expelled out via the wind outlet tube 7, while a little air flow goes in helix downwards along the inside wall of the conical barrel 10 together with the dust particles separated by centrifugal force, and finally enters into the dust-collecting barrel 14 via the ring gap for dust-falling 13 on the peripheral of the umbrella-shaped reflecting plate 11. No dust will cumulate on the top of the umbrella-shaped reflecting plate 11. Because of the umbrella-shaped reflecting plate 11, refluence air is prevented from raising dust again, thereby the secondary pollution will not occur and dedust efficiency is also improved.

The invention claimed is:

1. A pervasive dedusting device for a vacuum cleaner, which includes a tank with a wind inlet and a wind outlet, characterized in that the tank is provided with a first cyclone device and a second cyclone device;
the first cyclone device includes a filter barrel while the second cyclone device includes a cyclone barrel disposed inside the filter barrel, the cyclone barrel is configured to be a conical barrel with a smaller upper end and a larger lower end and a cyclone wind inlet is disposed on it;
the wind inlet on the tank and the cyclone wind inlet on the cyclone barrel are separated by the filter barrel and located in two chambers respectively;
a wind outlet tube is located in the upper end of the cyclone barrel and communicates with the wind outlet; and
the filter barrel has a cylindrical portion with a cylindrical sidewall including a cylindrical lower inner wall, the larger lower end of the cyclone barrel has a lower outer wall, the lower inner wall of the filter barrel is connected tightly to the lower outer wall of the cyclone barrel.

2. The pervasive dedusting device for a vacuum cleaner as claimed in accordance with claim 1, characterized in that said cyclone barrel includes an upper cylinder barrel and a lower conical barrel, the wind outlet tube enters inside the upper end of the cylinder barrel and the cyclone wind inlet is located on the sidewall of the cylinder barrel, there is also a dust-collecting opening in the lower end of the conical barrel.

3. The pervasive dedusting device for a vacuum cleaner as claimed in accordance with claim 1, characterized in that the lower portion of said cyclone barrel is provided with an umbrella-shaped reflecting plate which defines a refluence hole in the center, a ring gap for dust-falling is defined between the peripheral of the umbrella-shaped reflecting plate and the sidewall of the cyclone barrel.

4. The pervasive dedusting device for a vacuum cleaner as claimed in accordance with claim 3, characterized in that within said cyclone barrel, dust-collecting barrel is located bellow the lower portion of the ring gap for dust-falling, whose bottom end with an opening is connected to the bottom cover of the tank.

5. The pervasive dedusting device for a vacuum cleaner as claimed in accordance with claim 1, characterized in that said tank includes tank body and tank cover, the wind inlet is disposed in the upper portion of the tank body while the wind outlet is located in the top of the tank cover the cyclone wind inlet of the cyclone barrel is positioned within the tank cover and an upper end of the filter barrel with an opening is connected beneath the peripheral of the tank cover.

6. The pervasive dedusting device for a vacuum cleaner as claimed in accordance with claim 2, characterized in that said tank includes tank body and tank cover, the wind inlet is disposed in the upper portion of the tank body while the wind outlet is located in the top of the tank cover, the cyclone wind inlet of the cyclone barrel is positioned within the tank cover and an upper end of the filter barrel with an opening is connected beneath the peripheral of the tank cover.

7. The pervasive dedusting device for a vacuum cleaner as claimed in accordance with claim 3, characterized in that said tank includes tank body and tank cover, the wind inlet is disposed in the upper portion of the tank body while the wind outlet is located in the top of the tank cover, the cyclone wind inlet of the cyclone barrel is positioned within the tank cover and an upper end of the filter barrel with an opening is connected beneath the peripheral of the tank cover.

8. The pervasive dedusting device for a vacuum cleaner as claimed in accordance with claim 1, wherein the tight connection between the lower inner wall of the filter barrel and the lower outer wall of the cyclone barrel separates a lower portion of the cylindrical portion from an upper portion of the cylindrical portion.

9. The pervasive dedusting device for a vacuum cleaner as claimed in accordance with claim 2, wherein the tight connection between the lower inner wall of the filter barrel and the lower outer wall of the cyclone barrel separates a lower portion of the cylindrical portion from an upper portion of the cylindrical portion.

10. The pervasive dedusting device for a vacuum cleaner as claimed in accordance with claim 3, wherein the tight connection between the lower inner wall of the filter barrel and the lower outer wall of the cyclone barrel separates a lower portion of the cylindrical portion from an upper portion of the cylindrical portion.

\* \* \* \* \*